Feb. 21, 1967 J. H. RUSICK 3,305,634

SYSTEM AND METHOD OF CODE COMMUNICATION

Filed June 17, 1963 2 Sheets-Sheet 1

INVENTOR.
J.H.RUSICK

BY Forest B. Hitchcock
HIS ATTORNEY

Feb. 21, 1967 J. H. RUSICK 3,305,634

SYSTEM AND METHOD OF CODE COMMUNICATION

Filed June 17, 1963 2 Sheets-Sheet 2

INVENTOR.
J.H.RUSICK

BY Forest B. Hitchcock

HIS ATTORNEY

United States Patent Office 3,305,634

Patented Feb. 21, 1967

3,305,634

SYSTEM AND METHOD OF CODE COMMUNICATION

Jack H. Rusick, Rochester, N.Y., assignor to General Signal Corporation, Rochester, N.Y., a corporation of New York Filed June 17, 1963, Ser. No. 288,298
8 Claims. (Cl. 178—66)

This invention relates to systems and methods of communication of codes over a communication channel from a transmitting station to a receiving station, and it more particularly pertains to the system and method of communicating successive code elements of the same character in a binary code.

Codes commonly used in binary code transmission are of two general types, the first type requires a return to zero for a time interval after each character to mark each bit as a separate pulse so that the pulses can be counted by the receiver, and the second type does not have a return to zero between successive bits in the transmission of the same type of characters. The first type of system is time consuming because of the necessity of the time required for the return to zero between each of the bits. The second type of code transmission has its limitations as far as speed of communication is concerned because of the necessity for accurately synchronizing timing means at transmitting and receiving stations for measuring the respective bits of the code so that there will be no possibility of erroneous code communication due to overlapping of one bit into another.

The system according to the present invention overcomes the speed limitations of the above mentioned two types of code communication systems by providing a system wherein there is no time interval between the transmission of the bits of a code, but yet there is a distinct pulse for each bit even where there is a transmission of several like pulses in succession of either binary character.

The code characters transmitted according to the present invention can be conveniently called "mark" and "space" characters. These characters are transmitted over a communication channel from a transmitting station to a receiving station selectively as carrier pulses, high shift carrier pulses or low shift carrier pulses. The mark characters can be considered as being transmitted at a high shift frequency, the space characters can be considered as being transmitted at the low shift frequency and the carrier current can be considered as an intermediate third frequency that is selectively used to register that the character intended to be transmitted during a particular bit of the code is the same as the character that was transmitted during the preceding bit.

The transmission of the carrier current frequency during a bit following the transmission of a high shift frequency is therefore indicative of the transmission of a second successive mark character, while the transmission of the carrier frequency during a bit following the transmission of a low shift frequency is indicative of the transmission of a second space character. Thus the carrier frequency, which can be considered as an intermediate frequency is used in combination with both of the other frequencies to denote the transmission of like characters.

It is further provided that the frequencies are transmitted alternately where several similar successive characters are to be transmitted. Thus, for the transmission of a code having the characters mark-mark-mark, the frequency for the corresponding bits are transmitted as high shift frequency-intermediate frequency-high shift frequency. It is therefore provided that there is a change of frequency for each successive bit of a code even where there is transmission of similar successive characters.

By providing that there is always a change in frequency in progressing from one bit to the next in the transmission of a code, but without returning to zero for a time interval between each character, it is provided that the code can be transmitted at a maximum rate and can be accurately decoded without the use of synchronizing devices in that the receiving station can readily set up driving pulses in response to the changes in frequency for each bit to thereby properly allocate the respective characters received to the particular bits of the code for which they are intended.

An object of the present invention is to provide a method of using three frequencies selectively for communicating any binary code from a transmitting station to a receiving station wherein the transmission of one particular frequency is given the meaning of one character or another, dependent upon the character that was transmitted during the next preceding digit.

Another object of the present invention is to provide code transmitting means at a transmitting station for selectively transmitting similar successive characters in a binary code as two frequencies applied alternately to the communication channel for the respective digits of that portion of the code wherein the successive characters are similar.

Another object of the present invention is to provide a memory device as a part of a code transmitter which selects a particular frequency for transmission for a particular bit if the code to be transmitted calls for the transmission of a character during that bit similar to the character that was transmitted during the preceding bit.

Another object of the present invention is to transmit a particular frequency as either a mark or a space character for a second successive mark or a second successive space character during the transmission of a code.

Other objects, purposes and characteristic features of the present invention will be in part obvious from the accompanying drawings, and in part pointed out as the description of the invention progresses.

In describing the invention in detail, reference is made to the accompanying drawings wherein corresponding parts are identified by corresponding reference characters in the several figures, and in which.

The illustrations employed herein in the disclosure of one embodiment of the present invention have been arranged to facilitate the disclosure as to the mode of operation and the principles involved rather than for the purpose of illustrating the construction and arrangement of parts that would be employed in practice. The symbols (+) and (—) are employed to indicate connections to the positive and negative terminals respectively of suitable sources of direct current.

Figure 1:
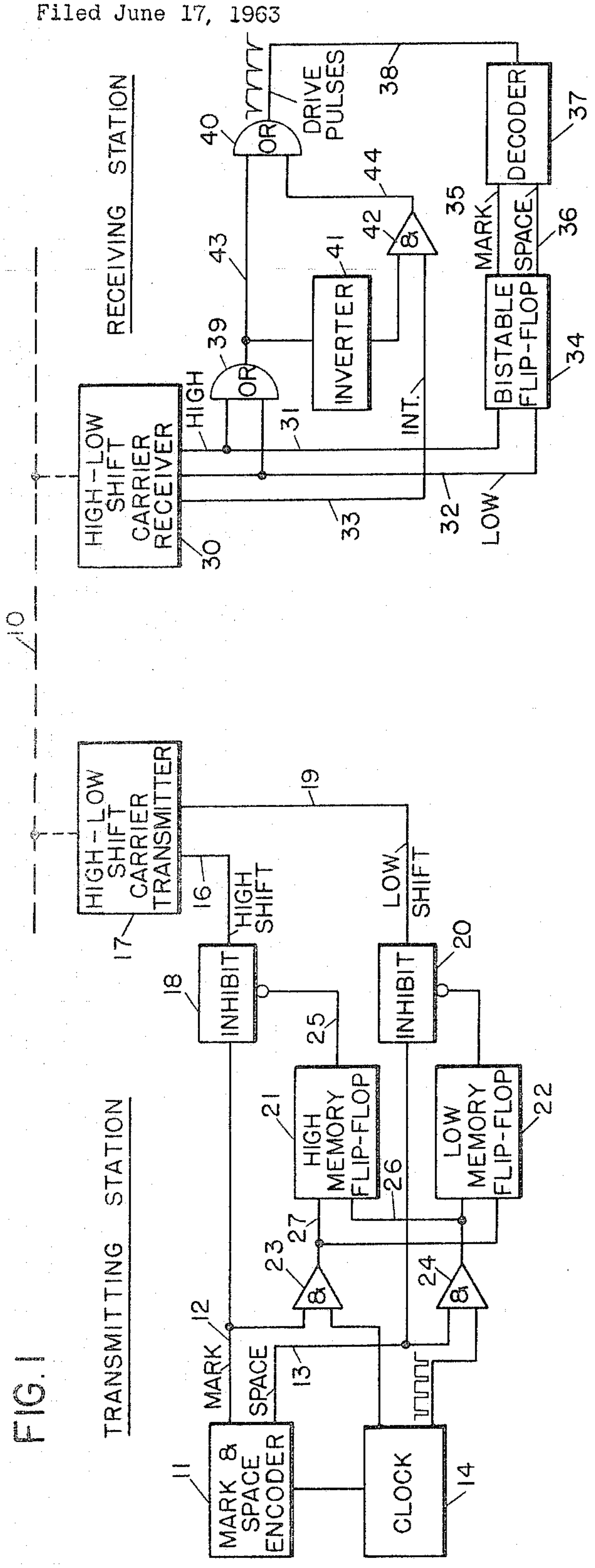
FIG. 1 is a block diagram of one embodiment of a code communication system according to the present invention.

With reference to FIG. 1, a typical system is illustrated wherein a transmitting station and a receiving station are connected to a suitable communication channel 10.

The transmitting station is illustrated as having a Mark and Space Encoder 11 for selecting the codes to be transmitted. The Encoder 11 has an output wire 12 which is energized whenever a mark character is to be transmitted and it has another output wire 13 which is energized whenever a space character is selected for transmission.

Figure 4:
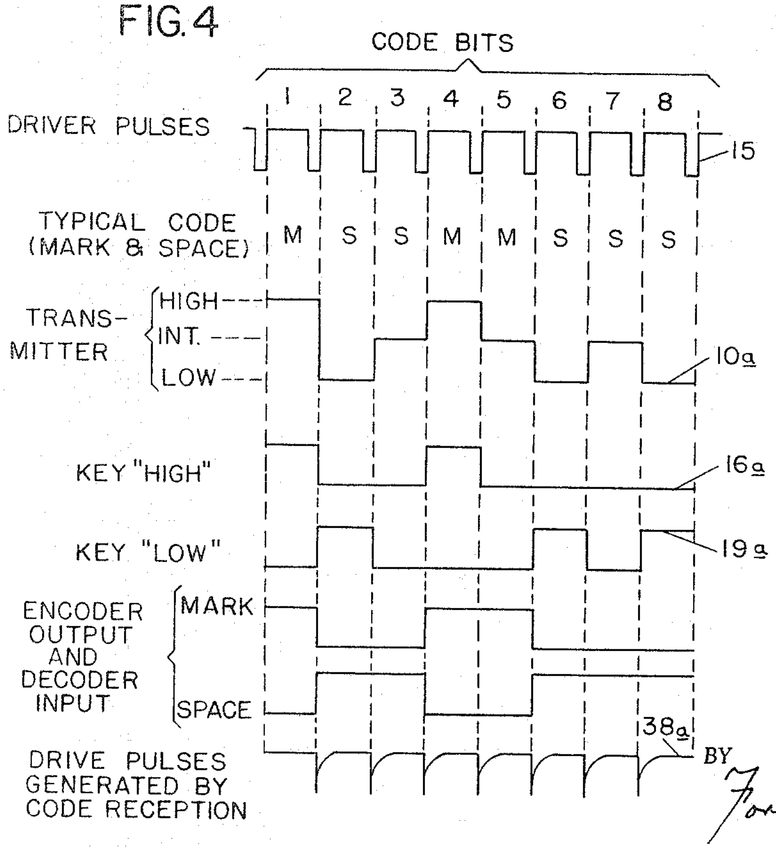
FIG. 4 illustrates by typical waveforms the selection, transmission and reception of a typical code.

The Encoder 11 is governed by a suitable Clock 14 which has an output providing a series of drive pulses as is illustrated by the waveform 15 of FIG. 4 so as to generate the time periods used for the code bits of a communication cycle.

A high shift frequency control is applied by the wire 16 to a suitable High-Low Shift Carrier Transmitter 17 whenever the wire 12 is energized in accordance with a mark character being selected for transmission by the Encoder 11 except as limited by an Inhibit 18. The Inhibit 18 normally permits energy to flow from wire 12 to wire 16, but inhibits such energization for alternate code bits where successive mark characters are transmitted. Thus wire 16 becomes energized, for example, during certain bits for the typical code mark-space-space-mark-mark-space-space-space as is illustrated by the waveform 16*a* of FIG. 4. Similarly, the low shift keying wire 19 has a waveform 19*a* of FIG. 4 in accordance with energy applied from the Encoder 11 to space wire 13 except as such energization is inhibited by an Inhibit 20.

Inasmuch as the carrier is present on the communication channel 10 as an intermediate frequency whenever there is no keying of either the high shift or a low shift frequency, the energy transmitted over the communication channel 10 for the typical code illustrated in FIG. 4 is a combination of the waveforms 16*a* and 19*a*, with the intermediate carrier frequency added as is shown by the waveform 10*a*. According to this waveform, the intermediate frequency is transmitted for alternate characters as long as the successive characters are of the same type, irrespective of whether the successive characters are mark or space characters. Thus, for as many successive mark characters as may be transmitted, these characters are transmitted as alternate high shift and intermediate frequency energization of the communication channel, and similarly for as many successive space characters as may be transmitted, the energy applied to the communication channel 10 is alternately low shift and intermediate frequencies.

A high memory flip-flop circuit 21 is provided in association with the transmission of mark characters so as to control the Inhibit 18 in a manner to interrupt the output of Inhibit 18 to wire 16 for alternate successive mark characters. Similarly, a low memory flip-flop circuit 22 is provided for the control of the Inhibit 20 in a manner to interrupt the application of energy to the low shift control wire 19 by the Inhibit 20 for alternate successive space characters to provide for the mode of operation that has been described. The High Memory Flip-flop 21 is controlled by an AND gate 23 jointly with the space wire 13, and similarly an AND gate 24 is used in combination with the mark wire 12 to control the Low Memory Flip-flop 22.

The High Memory Flip-flop 21 has an output 25 when mark characters are transmitted only for alternate bits of a code having successive mark characters. Energy applied to wire 25 actuates the Inhibit 18 to prevent an output to wire 16 and thus prevents the transmission of high shift frequency during the corresponding code bit. The High Memory Flip-flop 21 is reset whenever energy is applied to the reset wire 26 by the selection of a space character for transmission. When thus reset, the High Memory Flip-flop 21 is conditioned so that the next mark that is transmitted will actuate it to the opposite position, which in turn, will provide no output on wire 25 and thus permit the Inhibit 18 to have an output 16 for that bit in accordance with the energization of its input wire 12.

The AND circuit 23 has an output pulse applied to wire 27 at the beginning of each bit for each mark character that is transmitted, including a separate pulse for each of several successive mark characters that may be transmitted. These pulses are applied as an input to the High Memory Flip-flop 21 on wire 27 and this input triggers the Flip-flop 21 alternately from one condition to the other for the respective pulses that are received on wire 27. Inasmuch as there is an output applied to wire 25 for only one condition of the Flip-flop 21, the Inhibit 18 is rendered effective to block the energization of wires 16 for alternate pulses as long as successive mark characters are being transmitted. The function of the AND gate 23 is to form pulses corresponding to successive mark characters for actuation of the High Memory Flip-flop 21 to provide the mode of operation which has been described.

Figure 2:
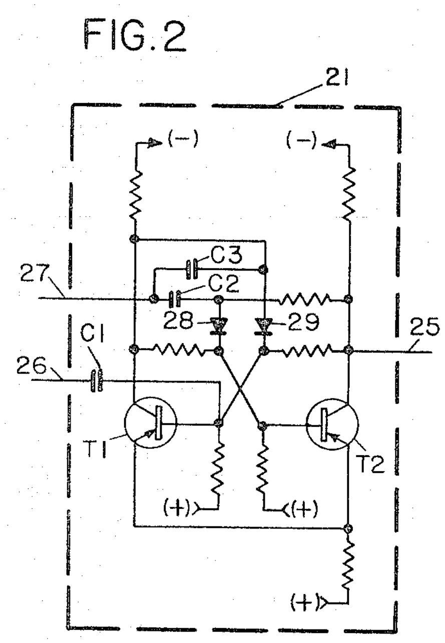
FIG. 2 is a diagram of a flip-flop circuit that can be used as a memory circuit in the selection of frequencies for transmission as particular elements of a code.

With reference to FIG. 2 a bistable flip-flop circuit is illustrated for the High Memory Flip-flop 21 which will provide the mode of operation that has been described. This flip-flop circuit comprises the transistors T1 and T2, the collector of the transistor T2 being connected to the output wire 25 which governs the control of the Inhibit 18 (see FIG. 1). The input wire 26 is connected to the base of the transistor T1 through a capacitor C1, and energization of this wire upon the transmission of a space character is effective only to reset the flip-flop. Thus the output wire 25 becomes energized in accordance with the transistor T2 having been rendered conductive by the reset operation. This resetting operation is rendered effective at the beginning of each bit for the transmission of a space character, and successive resets are effective only to maintain the transistor T2 conductive.

At the beginning of the first bit in which a mark character is to be transmitted, the energization of the input wire 27 sets the Flip-flop 21 through capacitor C2 and diode 28 so as to render the transistor T1 conductive and to terminate an output on the wire 25 to the Inhibit 18. This permits the wire 16 to be energized to provide for the transmission of a high shift frequency over the communication channel 10 in accordance with a mark being selected by the Encoder 11.

If a second successive mark character is selected for transmission, at the beginning of the bit for that second character, the pulse applied to wire 27 causes the Flip-flop 21 to be reset through capacitor C3 and diode 29 so that the transistor T2 is rendered conductive and so that there is an output on wire 25 to energize the Inhibit 18 and prevent an output on wire 16. This provides for the transmission of the carrier frequency as an intermediate frequency over the communication channel during the code bit corresponding to the second successive mark character.

If a third successive mark character is to be transmitted, the application of a pulse for the third successive bit to the input wire 27 of the Flip-flop 21 causes that flip-flop to be set so that the transistor T1 is rendered conductive and thus there is no output on the wire 25 to the Inhibit 18. Under these conditions, the wire 16 becomes energized in accordance with the energization of wire 12, and a high shift frequency is transmitted corresponding to the third successive mark character in the code. It will thus be readily apparent from the mode of operation that has been described, that the Flip-flop 21 is alternately set and reset as pulses are successively applied to the wire 27 from the AND gate 23 in accordance with the selection of successive mark characters for transmission.

Having thus described in detail the mode of operation of the High Memory Flip-flop 21 to transit successive mark characters as alternate frequencies, it is to be understood that a similar mode of operation is provided for the transmission of alternate low shift and intermediate frequencies in accordance with the selection for transmission of several successive space characters, the control being provided by the Low Memory Flip-flop 22, which is similar in structure to the High Memory Flip-flop shown in FIG. 2.

Figure 3:
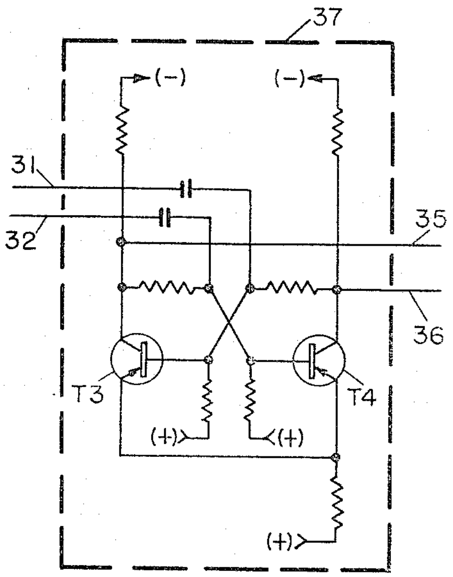
FIG. 3 is a diagram of a flip-flop circuit that can be used in the reception of codes.

The typical receiver station illustrated in FIG. 1 has a High-Low Shift Carrier Receiver 30 connected to the communication channel 10 for receiving the code pulses which are transmitted from the transmitting station. The Receiver 30 provides outputs selectively on wires 31, 32 and 33 in accordance with whether the energy received is of high shift frequency, low shift frequency or the intermediate frequency respectively. The high and low output wires 31 and 32 of the receiver are connected as an input to the bistable flip-flop 34 which converts the energization applied to this flip-flop into waveforms on mark and space wires 35 and 36 respectively corresponding to the waveforms 16*a* and 19*a* of FIG. 4. The Flip-flop 34 can be, for example, of the conventional bistable type such as is shown in FIG. 3, having transistors T3 and T4.

The wires 35 and 36 are connected to a suitable Decoder 37 which also has an input on wire 38 of drive pulses which are generated in accordance with the reception of the code at the receiving station, one pulse being formed for each bit of the code.

The waveform 38*a* of FIG. 4 illustrates the drive pulses that are applied to the Decoder 37 to actuate a suitable counter (not shown) for marking off the bits of the code. The drive pulses applied to wire 38 are generated by a circuit including OR gates 39 and 40, an Inverter 41 and an And Gate 42. The OR gate 39 provides that wire 43 becomes energized whenever high or low shift frequency energy is being received over the channel 10.

The Inverter 41 provides an output to an AND gate 42 when there is no energy on the wire 43, and at this time the wire 33 is energized by the High-Low Shift Carrier Receiver 30 because of the reception of an intermediate frequency so that there is an output for the AND gate 42 when the intermediate frequency is being received on wire 44. Because of the OR gate 40 being controlled by either the energization of wire 43 or the energization of wire 44, it has an output of drive pulses as is illustrated by the waveform 38*a* of FIG. 3, the change in the frequency at the end of each pulse being effective to generate the drive pulses as illustrated.

It will be noted from the mode of operation of the system as it has been described, that this method of code transmission requires no synchronization between the transmitting and receiving stations relative to the counting of code bits, it being sufficient that the Decoder 37 at the receiving station be capable of counting the drive pulses that are generated in response to the code received and that mark and space characters can be registered during such counting. Therefore there is no synchronization problems to limit the speed of code communication, and it is further provided that all of the transmitting time is utilized in that the code bits are transmitted successively, with no return to zero times, being required between code bits as in some types of code communication systems.

Having thus described one particular embodiment of a code communication system according to the present invention, it is desired to be understood that this form is selected to facilitate in the disclosure of the invention rather than to limit the number of forms which the invention may assume, and it is to be further understood that various adaptations, alterations and modifications may be applied to the specific form shown to meet the requirements of practice without in any manner departing from the spirit or scope of the present invention except as limited by the appending claims.

What I claim is:

1. A code communication system for the transmission of several successive code elements in a binary code by frequency shift carrier applied to a communication channel comprising:

(a) driver means for generating a series of pulses corresponding to the bits of a code, (b) encoder means for selecting a series of first and second type code elements for transmission, (c) transmitting means controlled jointly by said driver means and said encoder means for transmitting a selected given carrier frequency or a high or low shift from said given carrier frequency in accordance with the series of first and second type code elements selected by said encoder means, (d) said transmitting means being effective to transmit a high shift frequency for each of the first type of elements selected by said encoder means and a low shift frequency for each of the second type of elements selected by said encoder means, only provided that the same frequency has not been transmitted as the next preceding bit of the code, and (e) said carrier transmitting means being effective to transmit said carrier frequency for a second element of the same type in the series of code elements.

2. A code communication system according to claim 1 wherein the first and second type code elements transmitted by said carrier transmitting means are mark and space elements which are transmitted as high and low shift frequencies respectively except that said given carrier frequency is transmitted for either a second successive mark element or a second successive space element.

3. A code communication system according to claim 1 wherein a series of the same code elements in a code are transmitted for respective bits of a code alternately as a given shift frequency for the first bit, as said given carrier frequency for the second bit, and as said given shift frequency for the third bit.

4. A code communication system for the communication of codes comprising different series of first and second type code elements over a communication channel from a transmitting station to a receiving station comprising:

(a) driver means at the transmitting station for generating a series of pulses corresponding to bits of a code, (d) encoder means at the transmitting station for selecting a multiple element code for transmission comprising first and second type elements wherein a portion of the code has several successive elements of the same type, (c) transmitting means at the transmitting station controlled by said driver means and said encoder means for transmitting the code seelcted by the encoding means over the communication channel as selected first and second frequencies, the portion of the code having several successive elements of the same type being transmitted as different frequencies during alternate bits for as many bits as said encoder means has an output of successive elements of the same type, one of the different frequencies being said first or second frequency and the other of the different frequencies being a third frequency, (d) receiving means at the receiving station for receiving said code, and (e) means at the receiving station for converting the reception of said different frequencies alternately into an output having the same type elements for said portion of the code that has been selected for transmission by said encoder means.

5. A code communication system according to claim 4 wherein means is provided at the receiving station for generating drive pulses corresponding to the bits of the code in response to the reception of the different frequencies alternately.

6. The method of communicating a code comprising selected first and second type elements over a communication channel wherein the code includes a portion having several successive elements of the same type comprising the steps of:

(a) generating a series of pulses corresponding to the bits of the code, (b) generating first and second frequencies for transmission over the communication channel corresponding to the first and second types of elements respectively and generating a third frequency for transmission for alternate bits of the portion of the code having successive elements of the same type, (c) generating a series of pulses corresponding to the bits of a code received over the communication channel, and (d) converting the three frequencies received into first and second type elements wherein a continuous signal of the same type element is generated for the number of bits of the code corresponding to the portion having several successive code elements of the same type.

7. The method of communicating according to claim 6 wherein the first and second frequencies are different shift frequencies and the third frequency is a carrier frequency.

8. The method of communicating according to claim 7 wherein a shift frequency is generated for transmission for a first bit in the portion of the code having successive similar elements and the carrier frequency is generated for the next successive element of the same type.

References Cited by the Examiner

UNITED STATES PATENTS

| | | | |
|---|---|---|---|
| 1,930,046 | 10/1933 | Hammond | 325—30 |
| 3,020,399 | 2/1962 | Hollis | 325—163 X |

DAVID G. REDINBAUGH, *Primary Examiner.*

JOHN W. CALDWELL, *Examiner.*

S. J. GLASSMAN, *Assistant Examiner.*